United States Patent
Zeng et al.

(10) Patent No.: US 9,756,129 B2
(45) Date of Patent: Sep. 5, 2017

(54) WSDL/WADL REFERENCE DEFINITION INTEGRATION

(71) Applicant: Oracle International Corporation, Redwood Shores, CA (US)

(72) Inventors: Xiaochun Zeng, Beijing (CN); Jianhua Peng, Beijing (CN); Chengbo Ren, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 14/605,057

(22) Filed: Jan. 26, 2015

(65) Prior Publication Data
US 2016/0219105 A1   Jul. 28, 2016

(51) Int. Cl.
| | | |
|---|---|---|
| *G06F 15/16* | (2006.01) | |
| *H04L 29/08* | (2006.01) | |
| *G06F 9/44* | (2006.01) | |
| *G06F 9/50* | (2006.01) | |

(52) U.S. Cl.
CPC ............ *H04L 67/1097* (2013.01); *G06F 8/00* (2013.01); *G06F 8/36* (2013.01); *G06F 9/50* (2013.01); *H04L 67/18* (2013.01)

(58) Field of Classification Search
CPC ............................ H04L 67/1097; H04L 67/18
USPC ........................................................ 709/219
See application file for complete search history.

(56) References Cited

U.S. PATENT DOCUMENTS

| | | | |
|---|---|---|---|
| 7,360,202 B1* | 4/2008 | Seshadri | G06F 17/30867 707/E17.109 |
| 7,590,935 B2 | 9/2009 | Dumitru et al. | |
| 2008/0088877 A1* | 4/2008 | Cacenco | G06F 8/70 358/1.17 |
| 2008/0120607 A1 | 5/2008 | Dippel | |
| 2013/0227541 A1 | 8/2013 | Shadeck et al. | |
| 2013/0318160 A1* | 11/2013 | Beraka | H04L 67/104 709/204 |
| 2014/0033170 A1 | 1/2014 | Nimashakavi et al. | |
| 2014/0052825 A1* | 2/2014 | Luecke | H04L 67/327 709/219 |
| 2014/0289702 A1* | 9/2014 | McMahon | G06F 21/60 717/120 |

OTHER PUBLICATIONS

Oracle Data Sheet; "Oracle Communications Services Gatekeeper"; copyright 2014.

* cited by examiner

*Primary Examiner* — Sm Rahman
(74) *Attorney, Agent, or Firm* — Miles & Stockbridge P.C.

(57) ABSTRACT

A system transfers interface documents for a web service, such as WSDL or WADL documents. The documents include a service document and one or more reference definition documents. The system parses the service document to extract the location of the reference definition documents. The system moves the service document to a temporary storage location, and moves the reference definition documents to the temporary storage location. The system then, for each document that references one of the reference definition documents, modifies its location value to the temporary storage location.

17 Claims, 7 Drawing Sheets

WSDL/WADL REFERENCE DEFINITION INTEGRATION

FIELD

One embodiment is directed generally to a computer system, and in particular to a computer system that provides web services.

BACKGROUND INFORMATION

A "web service" is a method of communication between two electronic devices over a network, such as the Internet. Web services provide a software function represented as a network address over the Web, and are designed to support interoperable machine-to-machine interaction over a network. Because organizations use multiple software systems for management, the different software systems often need to exchange data with each other, and web services provide a method of communication that allows two software systems to exchange this data over the network. In a web service environment, the software system that requests data is referred to as a "service requester," and the software system that processes the request and provides the data is referred to as a "service provider."

Because multiple software systems for web services may be built using different programming languages, a data exchange is needed that does not depend upon a particular programming language. Since most types of software can interpret Extensible Markup Language ("XML") tags, web services typically use XML files for the data exchange. Definitions languages for XML files used for web services include the Web Services Description Language ("WSDL") and the Web Application Description Language ("WADL").

WSDL is an XML-based interface definition language that is used for describing the functionality offered by a web service. WSDL describes services as collections of network endpoints, or ports. The WSDL specification provides an XML format for documents for this purpose. The abstract definitions of ports and messages are separated from their concrete use or instance, allowing the reuse of these definitions. A port is defined by associating a network address with a reusable binding, and a collection of ports defines a service. Messages are abstract descriptions of the data being exchanged, and port types are abstract collections of supported operations. The concrete protocol and data format specifications for a particular port type constitutes a reusable binding, where the operations and messages are then bound to a concrete network protocol and message format. In this way, WSDL describes the public interface to the web service.

Similarly, WADL is a machine-readable XML description of web services. WADL models the resources provided by a service and the relationships between them. WADL is intended to simplify the reuse of web services that are based on the existing Hypertext Transfer Protocol ("HTTP") architecture of the Internet. It is platform and language independent and aims to promote reuse of applications beyond the basic use in a web browser.

SUMMARY

One embodiment is a system that transfers interface documents for a web service, such as WSDL or WADL documents. The documents include a service document and one or more reference definition documents. The system parses the service document to extract the location of the reference definition documents. The system moves the service document to a temporary storage location, and moves the reference definition documents to the temporary storage location. The system then, for each document that references one of the reference definition documents, modifies its location value to the temporary storage location.

DETAILED DESCRIPTION

One embodiment is a system that integrates WSDL/WADL documents so that the documents can be more easily transferred. WSDL/WADL documents are generally structured by separating the definitions according to their level of abstraction and storing the separated definitions in separate directories/folders. This technique helps in writing clearer service definitions. It also maximizes the ability to reuse service definitions of all kinds. As a result, WSDL/WADL documents structured with separate definitions are easier to use and maintain. However, having the definitions distributed in different directories can cause problems when transferring the WSDL/WADL documents. Therefore, one embodiment of the present invention packages an integrated and valid WSDL/WADL set that keeps the valid pending relationships so that the WSDL/WADL documents are convenient to transfer.

Figure 1:
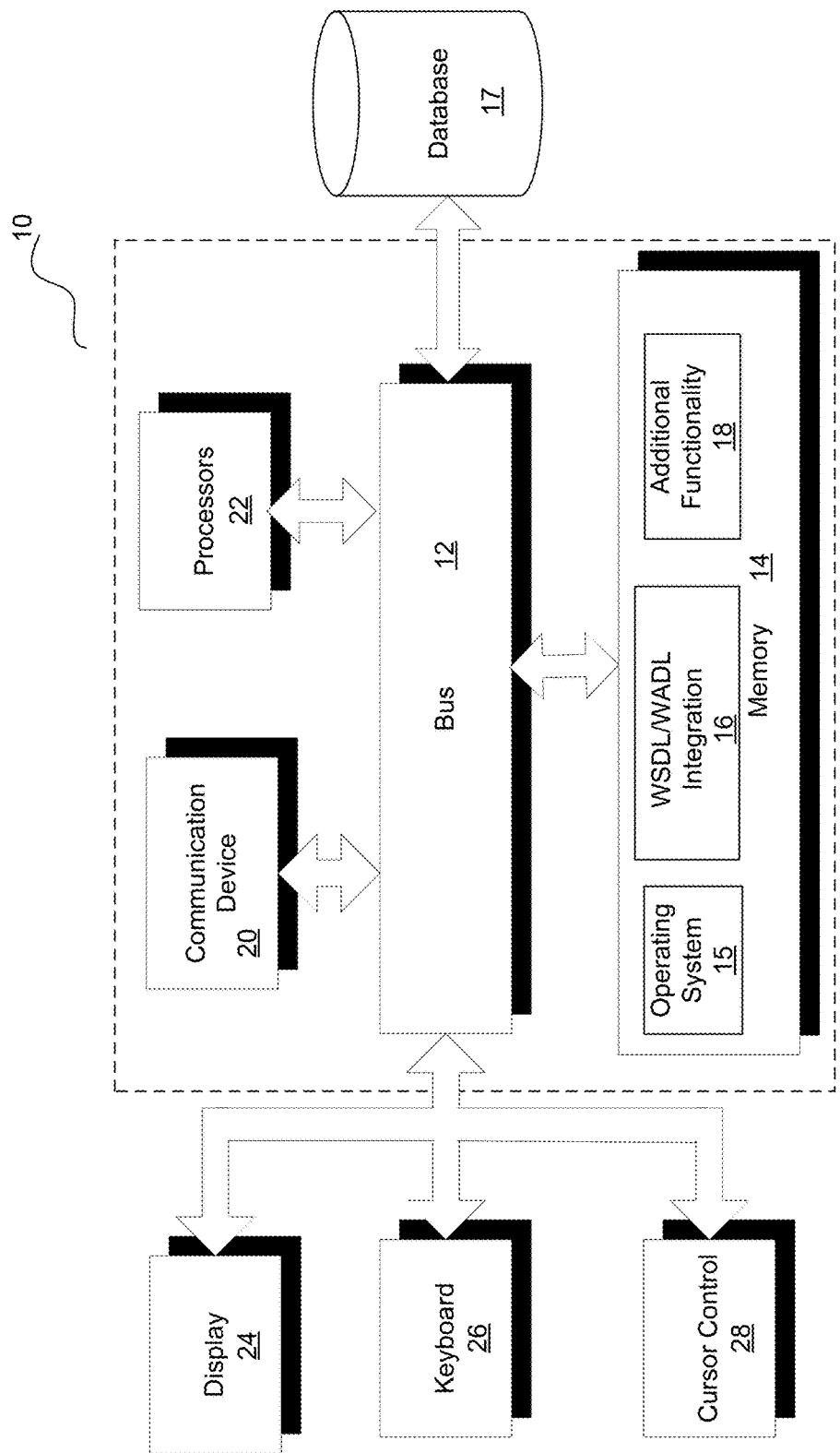
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a WSDL/WADL integration module 16 for providing integration of WSDL/WADL documents, and all other functionality disclosed herein. System 10 can be part of a larger system, such as a web server and any other associated functionality. Therefore, system 10 can include one or more additional functional modules 18 to include the additional functionality. In one embodiment, the additional functionality is the "Oracle Communications Services Gatekeeper" ("OCSG") from Oracle Corp. A database 17 is coupled to bus 12 to provide centralized storage for modules 16 and 18.

WSDL addresses the need to describe web services communications in some structured way by defining an XML grammar for describing network services as collections of communication endpoints capable of exchanging messages. WSDL service definitions provide documentation for distributed systems and serve as a recipe for automating the details involved in applications communication.

A WSDL document defines services as collections of network endpoints, or ports. In WSDL, the abstract definition of endpoints and messages is separated from their concrete network deployment or data format bindings. This allows the reuse of abstract definitions, including messages, which are abstract descriptions of the data being exchanged, and port types, which are abstract collections of operations. The concrete protocol and data format specifications for a particular port type constitute a reusable binding. A port is defined by associating a network address with a reusable binding, and a collection of ports define a service. Therefore, a WSDL document uses the following elements in the definition of network services:

Types: a container for data type definitions using some type system (such as XML Schema Definition ("XSD")).

Message: an abstract, typed definition of the data being communicated.

Operation: an abstract description of an action supported by the service.

Port Type: an abstract set of operations supported by one or more endpoints.

Binding: a concrete protocol and data format specification for a particular port type.

Port: a single endpoint defined as a combination of a binding and a network address.

Service: a collection of related endpoints.

WSDL does not introduce a new type definition language. WSDL recognizes the need for rich type systems for describing message formats, and supports the XML Schemas specification (i.e., XSD) as its canonical type system. However, since it is unreasonable to expect a single type system grammar to be used to describe all message formats present and future, WSDL allows using other type definition languages via extensibility.

In addition, WSDL defines a common binding mechanism. This is used to attach a specific protocol or data format or structure to an abstract message, operation, or endpoint. It allows the reuse of abstract definitions. Further, in addition to the core service definition framework, WSDL can accommodate specific binding extensions for the following protocols and message formats: SOAP 1.1. HTTP GET/POST and MIME.

Similar to WSDL, WADL is a machine-readable XML description of HTTP-based web applications (typically Representational State Transfer ("REST") web services). WADL models the resources provided by a service and the relationships between them. WADL is intended to simplify the reuse of web services that are based on the existing HTTP architecture of the Web. WADL is platform and language independent and aims to promote reuse of applications beyond the basic use in a web browser.

Figure 2:
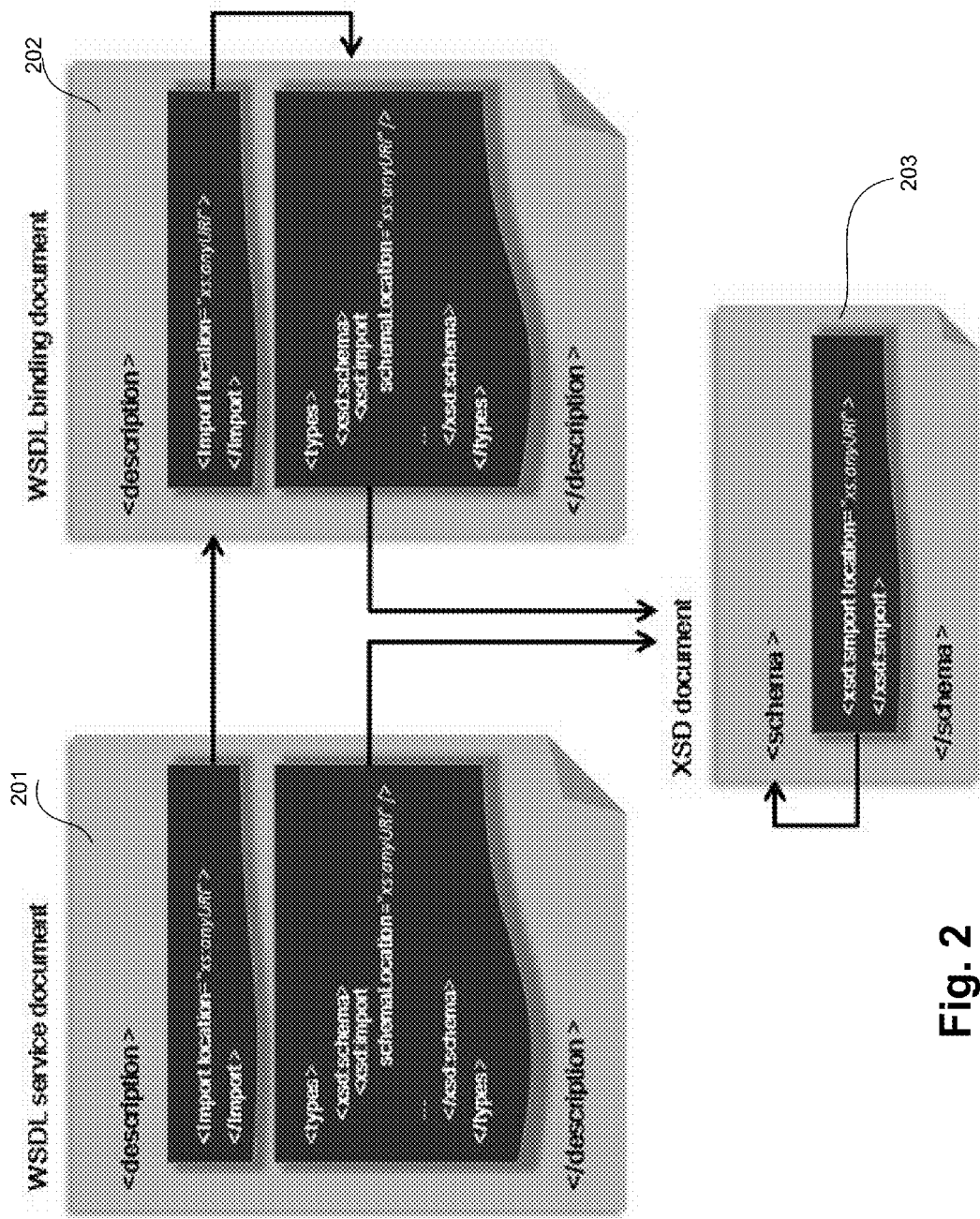
FIG. 2 is a diagram illustrating a common structure of WSDL documents in accordance to the World Wide Web Consortium ("W3C").

FIG. 2 is a diagram illustrating a common structure of WSDL documents in accordance to the World Wide Web Consortium ("W3C"). The documents include a WSDL service document 201, a WSDL binding document 202 and an XSD document 203.

Figure 3:
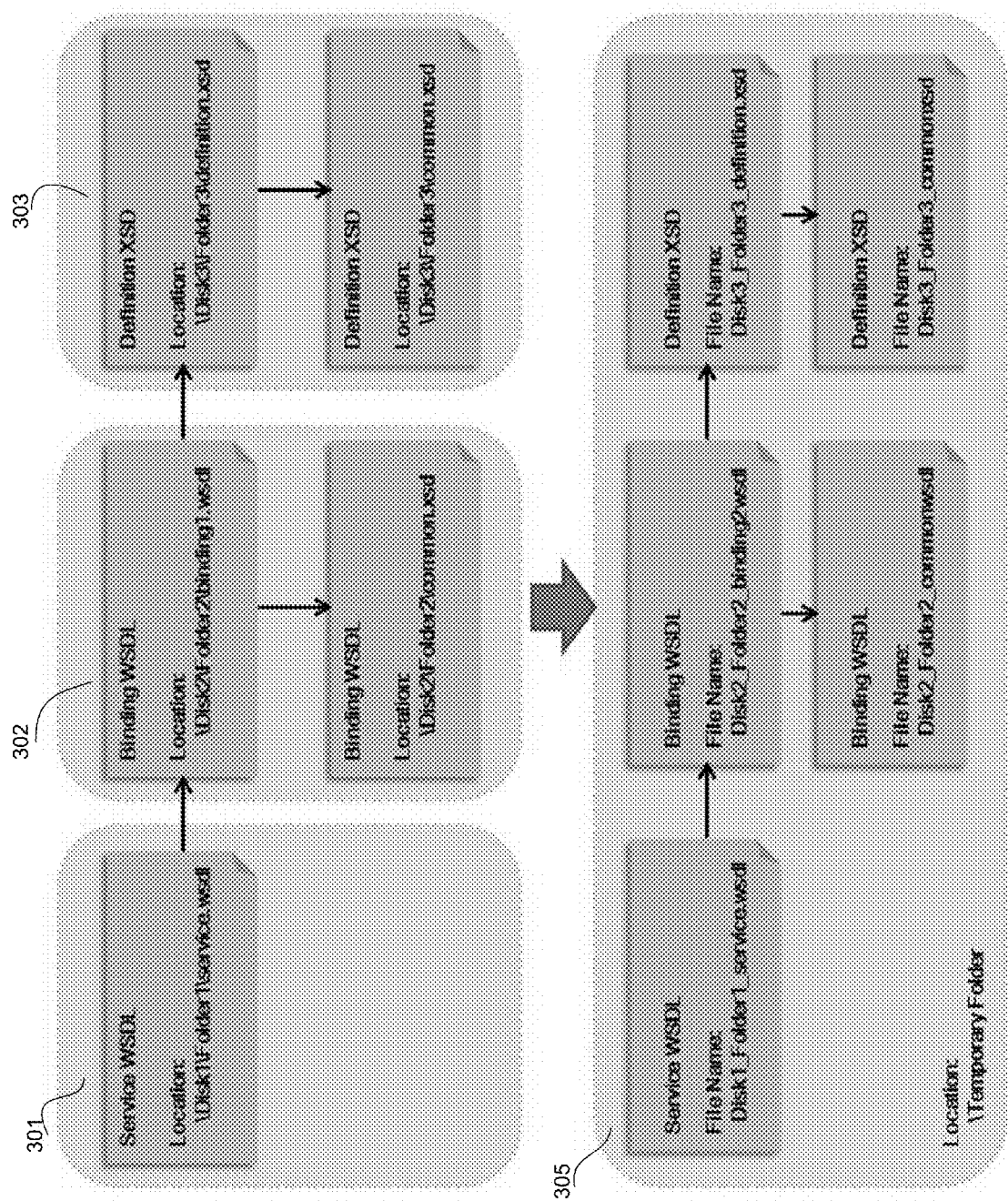
FIG. 3 is a diagram illustrating WSDL documents before and after integration in accordance with embodiments of the present invention.

FIG. 3 is a diagram illustrating WSDL documents before and after integration in accordance with embodiments of the present invention. As shown in FIG. 3, with WSDL documents, and equally applicable to WADL documents, the documents are typically structured by separating the definitions according to the level of abstraction. As a result, in many usage scenarios, the definitions may distribute in different directories/file locations, which causes problems when moving the WSDL/WADL documents and the corresponding definitions into an individual directory. Therefore, before definition integration in accordance to embodiments of the invention, a service document 301 may be located in "Folder1", a binding document 302 may be located in "Folder2" and a definition document 303 may be located in "Folder3", where the three folders are in different file locations.

In contrast, and in order to overcome the problems when moving WSDL/WADL documents, embodiments parse all of the WSDL/WADL documents and their definitions to organize their dependence. In order to move and reuse the documents as an entirety, all these documents are then modified to fit their dependence and then are copied into an individual directory or a package. Therefore, as a result of integration in accordance with embodiments of the invention, all WSDL documents are now stored in a single location 305 (i.e., in "Temporary Folder" 305) because embodiments modify the location values of the documents. The WSDL documents now can be conveniently transferred while maintaining the relationships between files.

Specifically, embodiments of the present invention access the service WSDL/WADL document 301 and extracts the location value of the reference definitions in the documents. The location value and the information of the reference definition documents is stored. This service document is then moved into a temporary storage area. All of the reference definition documents are then copied into this temporary location. When a new reference document is moved into the temporary place, the location value in any other documents that reference it is modified to the new location value. If the main interface definition is WADL based, the only reference definition document is the XSD definition document. If the interface is WSDL based, the reference documents can also include another WSDL document as shown in FIG. 2 (i.e., documents 202 and 203).

In embodiments with more than one reference document having the same name, the movement of documents also include a name changing. The original location information of the document is also added to the document name as a prefix. Further, the corresponding reference location value in the other document will be modified. The document movement, name changing and the reference context modification will act on the service document and all the referenced documents.

As an example of embodiments of the invention for WSDL documents, a user may desire to transfer a set of documents, including one WSDL service document, from local storage to the remote server. As an example of when WSDL/WADL documents need to transferred, in the OCSG embodiment, an ability to generate a plug-in base on the customer's defined interface is provided. The customer can upload the WSDL/WADL definition to the OCSG in the portal. The OCSG will implement this interface and provide the service for the customer. In this case, the customer needs to transfer integrated WSDL/WADL definition documents in the portal from the customer's computer to the OCSG server.

Figure 4:
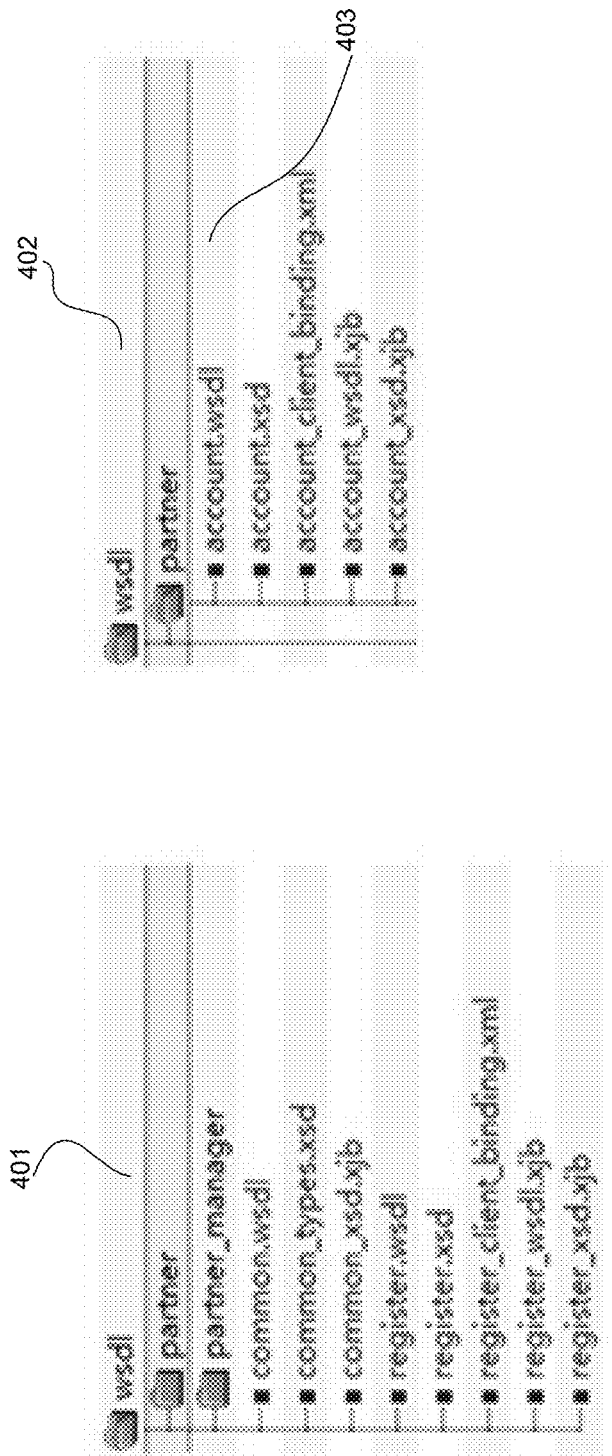
FIG. 4 illustrates an example file structure as folders in accordance to one embodiment.

In the typical use case, there are a set of documents in the local storage, including some WSDL services. An example file structure is shown in FIG. 4 as folders 401, 402 in accordance to one embodiment. In this embodiment, the service WSDL will be the "account.wsdl" 403 under the partner folder.

The portion of service file 403 related to the pending definitions is as follows:

```
<import namespace="http://www.oracle.com/wsdl/ocsg/portal/faults/"
location="../common.wsdl"/>
<types>
<xsd:schema>
<xsd:import namespace="http://www.oracle.com/wsdl/ocsg/portal/partner/
account/"
schemaLocation="account.xsd"></xsd:import>
</xsd:schema>
</types>
```

As shown there are two files needed to assume the integration of the service WSDL, "common.wsdl" and "account.xsd"

After receiving the common.wsdl file, embodiments create a temporary folder and place the common.wsdl file in the temporary folder. Embodiments then parse the common.wsdl file and collect a pending definition file name. Embodiments then modify the location of the definition in the common.wsdl file.

Embodiments next retrieve the definition document (i.e., account.xsd) which is shown as follows:

```
<xs:import namespace="http://www.oracle.com/wsdl/ocsg/portal/
common/" schemaLocation="../common_types.xsd"></xs:import>
```

As with the common.wsdl file, embodiments then parse the account.xsd file and collect a pending definition file name. Embodiments then modify the location of the definition in the account.xsd file. Embodiments then place this modified file in the temporary folder, determine if the file name is unique, and modify the corresponding definition content in the main service document, account.wsdl, to match the new definition file name and path. Similar functionality is performed on all pending definition documents.

Embodiments generate a message that informs the service document of any missing files that need to be parsed in order to integrate the documents. Embodiments can receive this information and display the information in a user interface 501 shown in FIG. 5.

Figure 5:
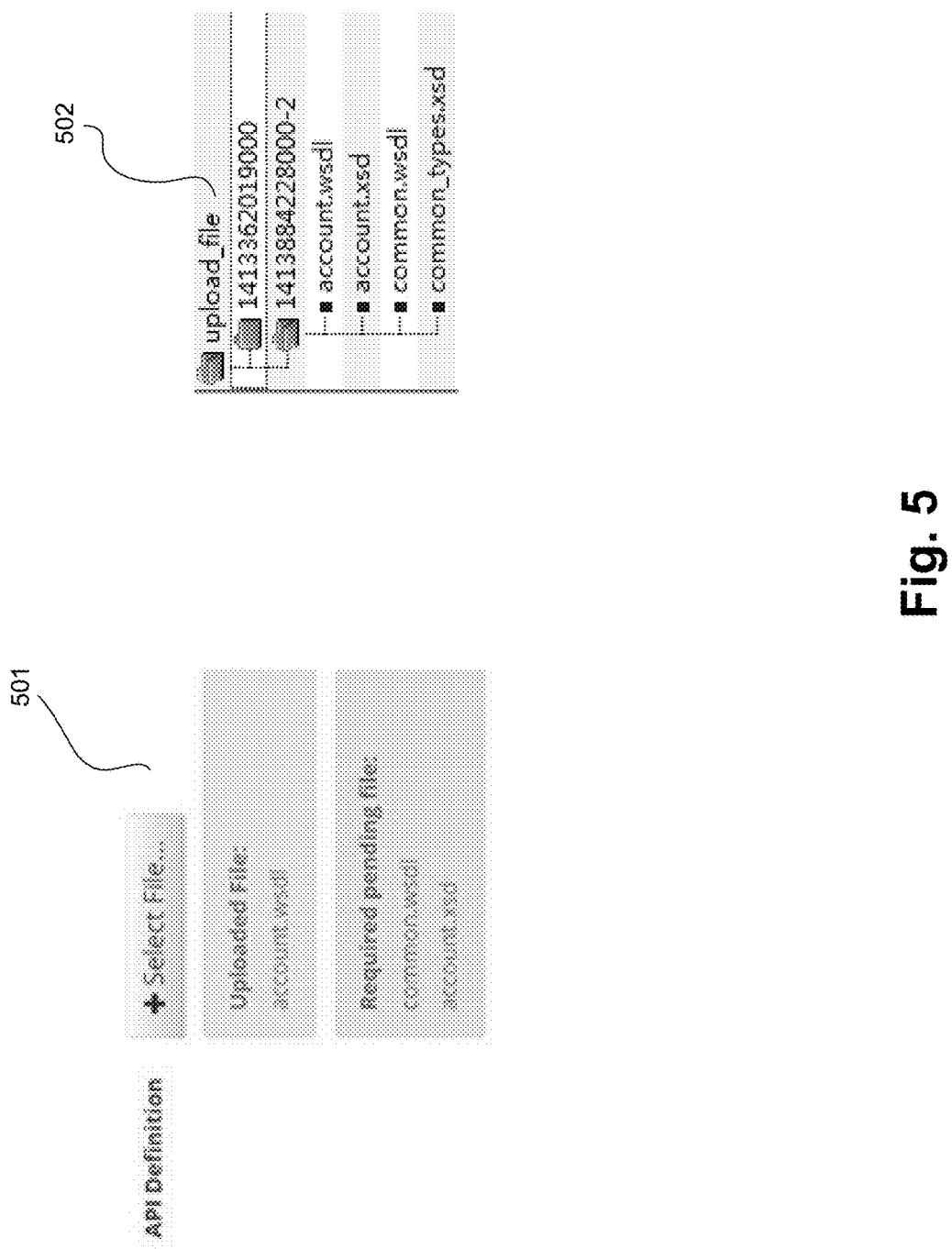
FIG. 5 illustrates an example user interface and the content of a temporary folder in accordance to one embodiment.

Finally, when all the files have been parsed, the content of the temporary folder is shown at 502 of FIG. 5. The modified service document, account.wsdl, with the pending definition is as follows, and can be compared to the unmodified account.wsdl document above:

```
<import location="common.wsdl" namespace="http://www.oracle.com/
wsdl/ocsg/portal/faults/"/>
<types>
<xsd:schema>
<xsd:import namespace="http://www.oracle.com/wsdl/ocsg/portal/partner/
account/" schemaLocation="account.xsd"/>
</xsd:schema>
</types>
```

The modified account.xsd document is as follows, and can be as compared to the unmodified account.xsd document above:

<xs:import namespace="http://www.oracle.com/wsdl/ocsg/portal/common/"
schemaLocation="common_types.xsd"/>

The temporary file is now in a packaged state and ready to be transferred.

Figure 6:
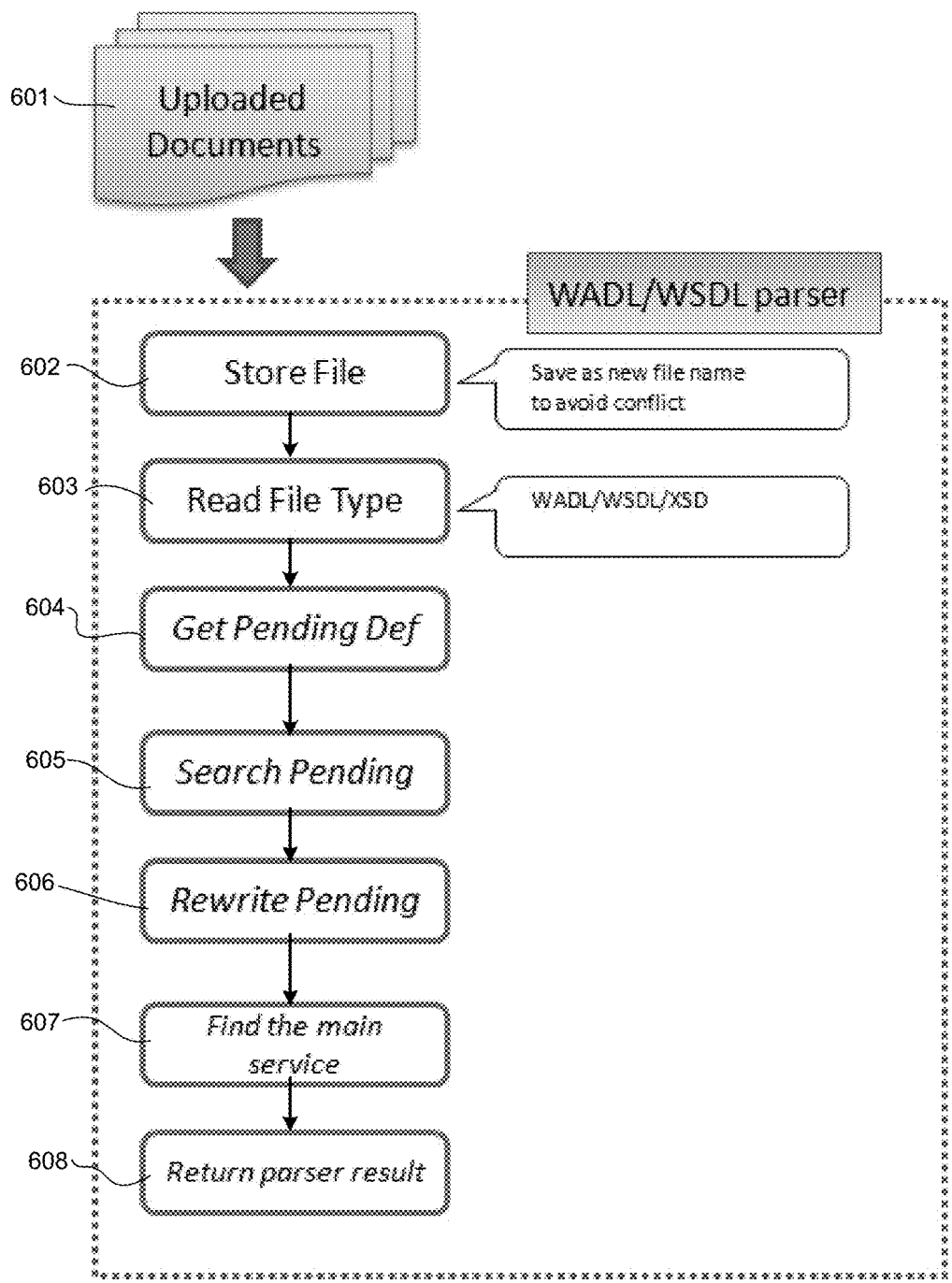
FIG. 6 is a flow diagram of the functionality of the system of FIG. 1 when integrating WSDL/WADL documents, in accordance with an embodiment.

FIG. 6 is a flow diagram of the functionality of system 10 of FIG. 1 when integrating WSDL/WADL documents, in accordance with an embodiment. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 601, WSDL/WADL documents/files (referred to as "interface documents") are uploaded. The documents can include numerous files, including service documents, binding documents and XSD definition documents. The WSDL/WADL documents can function as a service interface for a web service. Each document is then parsed beginning at 602.

At 602, the document is stored using a new file name to avoid conflict with the previous file name. This file may be considered a temporary file.

At 603, the file type is read/determined. The file type may be a WADL, WSDL, or XSD file type.

At 604, the pending definition file name for the file is retrieved.

At 605, the pending definition is searched, in order to go through the temporary directory and make sure the required definition file is included in the uploaded files.

At 606, the pending definition is rewritten. The pending definition document location information in the interface document may originally link to the original path in the customer's environment, and now the XSD file is saved in the temporary folder with a new name. The rewrite operation will read the original document and position the content of this definition, then modify this location parameter to the new one (new path and new file name), such as: location='D:\temp\example.xsd'.

At 607, the main service document is found. As an integrated interface definition document set, there exists one main service interface definition document to describe the interface method(s). This document will be the first node of the pending documents link. There will be no other documents pending on this service document. The other documents must be child nodes in order to subscribe to the needed structure in the main service document, or to subscribe another pending document which is for the main service document.

At 608, the parser result is returned. The return information in one embodiment includes the following:
IsLegal Tag(Boolean)
Log(Array): For developer debug information.
Received Files(Array):
  File name
  Pending File name
  IsMain Tag(Boolean)
Missing Files(Array)
Error Message(String).

The functionality of 601-608 is looped to upload other documents until the parser returns an "IsLegal" tag.

Figure 7:
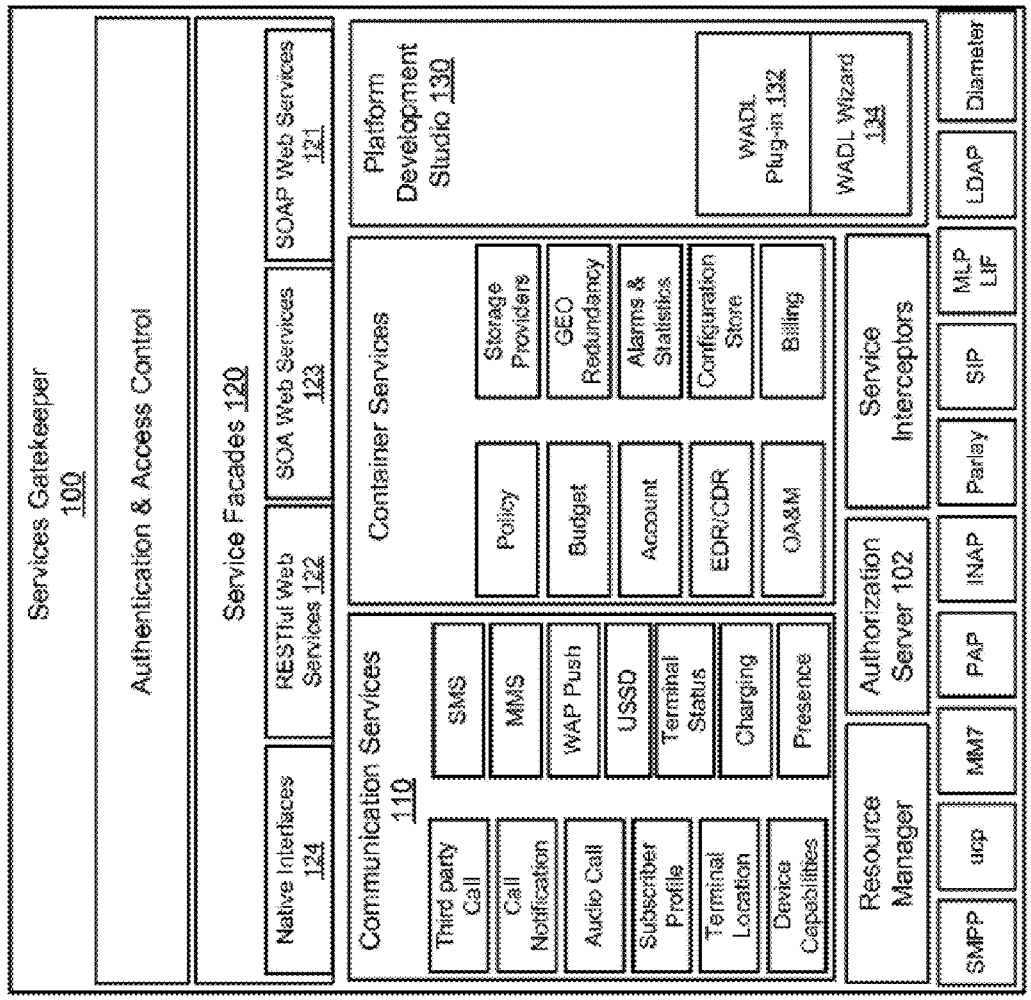
FIG. 7 is a block diagram of a services gatekeeper in accordance with an embodiment of the invention.

One embodiment functions as a service gatekeeper (i.e., OCSG) and provides web services to communication providers, and provides the functionality described above for transferring WSDL/WADL files. FIG. 7 is a block diagram of a services gatekeeper 100 in accordance with an embodiment of the invention. As shown in FIG. 7, services gatekeeper 100 controls access to a plurality of communications services 110. Services gatekeeper 100 facilitates the communication operator's need to provide third party service provider access to its key value-added network capabilities as well as third party APIs in a controlled, secure, optimized, and automated fashion, while providing robust customization and extensibility. Services gatekeeper 100 delivers a converged service exposure layer of service facades 120, providing operators the choice and flexibility of using traditional SOAP Web Services 121, RESTful Web Services 122, Service Oriented Architecture ("SOA") Web Services 123, and native telecommunication interfaces 124 to expose their network capabilities to third party partners. The exposure platform is based on IT, Web and telecommunication industry standards including, for example, Java Platform, Enterprise Edition (Java EE), Service Oriented Architecture ("SOA"), Parlay X, Session Initiation Protocol ("SIP"), Diameter, OAuth, Simple Object Access Protocol ("SOAP"), and Representational State Transfer ("REST")-ful Web Services. Services gatekeeper 100 also includes an authorization server 102 which provides an authorization service.

Services gatekeeper 100 includes pre-built, specialized components as part of communication services 110, to allow third party developers and application partners to easily access the operator's telecommunication network capabilities. The network capabilities supported by the communication services include messaging, call control, terminal location, payment, profile and presence. These communication services 110 APIs expose user information such as charging capability, location, and profile to third party applications. Services gatekeeper 100 provides flexibility and choice in how third party developers and applications can access the operator's network through multiple types access interfaces using service facades 120.

Services gatekeeper 100 supports two types of RESTful communication services. A REST2REST service communicates with an existing REST API service facade allowing communication between RESTful interfaces. A REST Exposure is a custom service facade providing an application bound, network-facing service used when RESTful requests are sent to a custom network implementation for translation and processing. Services gatekeeper 100 mediates traffic between users and existing REST infrastructure allowing the application of service level agreements, policy enforcement, security, alarms and statistics for more control over communication services.

Services gatekeeper 100 includes a platform development studio 130. Because all networks are different, matching the particular requirements and capabilities of some networks sometimes means that services gatekeeper 100 must be extended or that certain aspects of it must be closely integrated with existing network functionality. Platform development studio 130 is designed to ease this process by providing for the creation, integration, testing and customization of communication services.

Platform development studio 130 includes a WADL plug-in 132 that creates projects based on the responses that the developer makes to a WADL wizard 134. WADL wizard 134 generates REST communication services from WADL files representing RESTful web application services. Services gatekeeper 100 can then use the generated REST communication service to handle RESTful communications between platforms. WADL wizard 134 can be used to create both REST2REST (e.g., a network plug-in that interfaces with an existing service facade) and REST Exposure services (e.g., a service facade). In one embodiment, WADL plug-in 132 takes WADL files as the only input and automatically generates REST2REST services including server-side and client-side components.

WADL plug-in 132 generates end to end RESTful communication services. The RESTful communication service offers REST2REST functionality seamlessly with automatic support for the API agnostic features such as policy enforcement, load balancing, routing, failover, logging, accounting, format conversion (XML2JSON,JSON2XML) etc. WADL plug-in 132 generates the code for the RESTful communication service based on the WADL files and internal templates. The WADL files define the service interface and the templates define the code logic. The generated code can be in the form of WSDL documents.

As disclosed, embodiments receive WSDL/WADL documents, parse the documents, and modify the definitions. As a result, the WSDL/WADL documents form an integrated package that can be more easily transferred.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to transfer interface documents for a web service comprising a service document and one or more reference definition documents, the transferring comprising:
  parsing the service document to extract and store a location of a first reference definition document;
  moving the service document to a new storage location;
  moving the first reference definition document to the new storage location;

determining any documents that reference the first reference definition document, and for each determined document modifying a location value to the new storage location;

changing a name of at least one of the reference definition documents when two or more of the reference definition documents have a same name; and moving all of the reference definition documents to the new storage location to form an integrated file;

wherein for each interface document, the service document and the reference definition documents are each stored in different file locations, and each interface document comprises a Web Services Description Language (WSDL) document or a Web Application Description Language (WADL) document;

wherein after the moving all of the reference definition documents, the service document and the reference definition documents are each stored in a same file location.

2. The computer readable medium of claim 1, further comprising moving all of the reference definition documents to the new storage location to form an integrated file.

3. The computer readable medium of claim 2, further comprising transferring the integrated file.

4. The computer readable medium of claim 1, wherein the first reference definition document is an Extensible Markup Language Schema Definition (XSD) document.

5. The computer readable medium of claim 1, further comprising: determining whether two or more of the reference definition documents have the same name; and changing a name of all but one of the two or more reference definition documents that have the same name.

6. The computer readable medium of claim 1, wherein the interface documents further comprise a binding document stored in the different file location from the service document and the reference definition documents, further comprising moving the service document to the new storage location.

7. A method of transferring interface documents for a web service comprising a service document and one or more reference definition documents, the method comprising:

parsing the service document to extract the location of the reference definition documents;

moving the service document to a temporary storage location;

moving the reference definition documents to the temporary storage location;

for each document that references one of the reference definition documents, modifying its location value to the temporary storage location;

changing a name of at least one of the reference definition documents when two or more of the reference definition documents have a same name; and moving all of the reference definition documents to the new storage location to form an integrated file;

wherein for each interface document, the service document and the reference definition documents are each stored in different file locations, and each interface document comprises a Web Services Description Language (WSDL) document or a Web Application Description Language (WADL) document;

wherein after the moving all of the reference definition documents, the service document and the reference definition documents are each stored in a same file location.

8. The method of claim 7, further comprising transferring all documents stored in the temporary storage location.

9. The method of claim 7, further comprising forming an integrated file from the documents stored in the temporary storage location.

10. The method of claim 7, further comprising changing a name of one or more of the reference definition documents.

11. The method of claim 7, wherein the reference definition documents comprise Extensible Markup Language Schema Definition (XSD) documents.

12. The method of claim 7, wherein the interface documents further comprise a binding document stored in the different file location from the service document and the reference definition documents, further comprising moving the service document to the new storage location.

13. A web service server comprising:

a processor;

a memory coupled to the processor and storing instructions that when executed by the processor, transfers interface document files comprising a service document and one or more reference definition documents, the transferring comprising:

receiving the a service document and the one or more reference definition documents:

parsing the service document to extract the location of the reference definition documents;

moving the service document to a temporary storage location;

moving the reference definition documents to the temporary storage location;

for each document that references one of the reference definition documents, modifying its location value to the temporary storage location;

changing a name of at least one of the reference definition documents when two or more of the reference definition documents have a same name; and moving all of the reference definition documents to the new storage location to form an integrated file;

wherein for each interface document, the service document and the reference definition documents are each stored in different file locations, and each interface document comprises a Web Services Description Language (WSDL) document or a Web Application Description Language (WADL) document;

wherein after the moving all of the reference definition documents, the service document and the reference definition documents are each stored in a same file location.

14. The web service server of claim 13, the transferring further comprising forming an integrated file from the documents stored in the temporary storage location.

15. The web service server of claim 14, the transferring further comprising moving the integrated file.

16. The web service server of claim 13, wherein the reference definition documents comprises Extensible Markup Language Schema Definition (XSD) documents.

17. The web service server of claim 13, wherein the interface documents further comprise a binding document stored in the different file location from the service document and the reference definition documents, further comprising moving the service document to the new storage location.

* * * * *